(12) United States Patent  
Parker (10) Patent No.: US 11,328,220 B2  
(45) Date of Patent: May 10, 2022

(54) PREDICTION CHARACTERIZATION FOR BLACK BOX MACHINE LEARNING MODELS

(71) Applicant: BigML, Inc., Corvallis, OR (US)

(72) Inventor: Charles Parker, Corvallis, OR (US)

( * ) Notice: Subject to any disclaimer, the term of this patent is extended or adjusted under 35 U.S.C. 154(b) by 585 days.

(21) Appl. No.: 16/124,047

(22) Filed: Sep. 6, 2018

(65) Prior Publication Data

US 2019/0122135 A1 Apr. 25, 2019

Related U.S. Application Data

(60) Provisional application No. 62/554,949, filed on Sep. 6, 2017.

(51) Int. Cl.
| | |
|---|---|
| *G06N 20/00* | (2019.01) |
| *G06N 5/04* | (2006.01) |
| *G06N 5/00* | (2006.01) |

(52) U.S. Cl.  
CPC .............. *G06N 20/00* (2019.01); *G06N 5/003* (2013.01); *G06N 5/046* (2013.01)

(58) Field of Classification Search  
CPC ........ G06N 20/00; G06N 20/10; G06N 20/20; G06N 5/046; G06N 5/003  
See application file for complete search history.

(56) References Cited

U.S. PATENT DOCUMENTS

2002/0169736 A1* 11/2002 Howard ................. G06K 9/626  
706/47  
2016/0379133 A1* 12/2016 Shteingart ............. G06N 20/00  
706/12

OTHER PUBLICATIONS

BigML.com blog post Streaming Histograms for Clojure and Java (https://blog.bigml.com/2013/02/11/streaming-histograms-for-clojure-and-java/), published online Feb. 11, 2013 (Year: 2013).*  
BigML.com Github Histogram README.md (https://github.com/bigmlcom/histogram/blob/master/README.md), published online Jul. 29, 2015 (Year: 2015).*  
Liu et al., Integrating Classification and Association Rule Mining, KDD-98 Proceedings, AAAI, 1998, 7 pages (Year: 1998).*

* cited by examiner

*Primary Examiner* — Li B. Zhen  
*Assistant Examiner* — William Wai Yin Kwan  
(74) *Attorney, Agent, or Firm* — FisherBroyles, LLP; Jeremy P. Sanders (57) ABSTRACT

A non-transitory computer-readable medium including instructions, which when executed by one or more processors of a computing system, causes the computing system to: access a machine learning model m, an input data point P to m, P including one or more features, and a prediction m(P) of m for P; create a set of perturbed input data points Pk from P by selecting a new value for at least one feature of P for each perturbed input data point; obtain a prediction m(Pk) for each of the perturbed input data points; analyze the predictions m(Pk) for the perturbed input data points to determine which features are most influential to the prediction; and output the analysis results to a user.

16 Claims, 8 Drawing Sheets

PREDICTION CHARACTERIZATION FOR BLACK BOX MACHINE LEARNING MODELS

PRIORITY

This application is a non-provisional of and claims priority benefit to U.S. Provisional Patent Application No. 62/554,949, filed on Sep. 6, 2017.

COPYRIGHT NOTICE

©2018 BigML, Inc. A portion of the present disclosure may contain material that is subject to copyright protection. The copyright owner has no objection to the facsimile reproduction by anyone of the present disclosure, as it appears in the Patent and Trademark Office patent file or records, but otherwise reserves all copyright rights whatsoever.

TECHNICAL FIELD

The present disclosure pertains to data processing, and in particular to systems and methods for characterizing black box machine learning models.

BACKGROUND

The concept of a "black box" is used to describe a situation in which a scientist endeavors to learn as much as possible about an entity or physical system, but is limited in the type of information that can be obtained. Traditionally, only system behaviors are observed, with no way of knowing the probable (internal) mechanisms that determine the observed behaviors. For most of its history, for example, psychology was limited to studying the brain as a black box because it was virtually impossible to peer inside it to learn how the brain actually functions.

Similarly, in the world of data mining and predictive modeling, a black box refers to any machine learning system that is unknown to a given user. For example, scoring algorithms for insurance premiums, credit granting, even college admissions, all exist, and mostly are not disclosed to the applicants of whatever is being applied for. Thus, to the applicant, the algorithms used are a "black box," and thus the applicant has no way to understand how to improve his or her score, or what the key drivers of that score even are. Thus, the concept of the black box often comes up in the context of proprietary prediction systems in which the vendor does not disclose details of the algorithm by which the predictions are being made. This may be because the algorithms are proprietary (or trade secret).

SUMMARY OF THE INVENTION

The following is a summary of the present disclosure in order to provide a basic understanding of some features and context. This summary is not intended to identify key or critical elements of the disclosure or to delineate the scope of the disclosure. Its sole purpose is to present some concepts of the present disclosure in simplified form as a prelude to the detailed description provided below.

A machine learning "vendor", such as, for example, in a software as a service (SaaS) context, may train thousands of networks on dozens of datasets in order to test the effectiveness of various algorithms. As such, the vendor learns some general rules about what makes one network structure better than another for a given dataset. On that basis, such a vendor may suggest a structure and set of parameters that is likely to perform well for a given user's dataset. Further, the vendor system may analyze the performance of the resulting model (for example, using a hold back dataset), and may thereby discover a better solution. In some cases, based on a received dataset, a vendor may conduct a search over all possible networks, returning the best network found for processing the given dataset. If one or more of the models under consideration is a black box, a user cannot discern the relative influence of the features of the input set. It is thus useful to programmatically characterize predictions coming from a black box model; and in particular, to identify what changes to the input data are most likely to induce changes in the predictions.

DETAILED DESCRIPTION OF PREFERRED EMBODIMENTS

Machine learning systems and methods process an input dataset to build one or more prediction models. The resulting model may be presented, for example, as a decision tree. In other cases, for example, the model may be a "black box" so that the influence of various features in the dataset on the results are unknown.

In embodiments, a non-transitory computer-readable medium including instructions, which when executed by one or more processors of a computing system, causes the computing system to: receive a machine learning model m, an input data point P to m, P including one or more features, and a prediction m(P) of m for P; create a set of perturbed input data points Pk from P by selecting a new value for at least one feature of P for each perturbed input data point; obtain a prediction m(Pk) for each of the perturbed input data points; analyze the predictions m(Pk) for the perturbed input data points to determine which features are most influential to the prediction; and output the analysis results to a user.

In embodiments, a computing system includes one or more processors to implement a model characterization engine, the model characterization engine to: access a machine learning model m, an input data point P to m, P including one or more features, and a prediction m(P) of m for P; create a set of perturbed input data points (Pk) from P by changing the value of at least one feature of P for each perturbed input data point; obtain a prediction m(Pk) for each of the perturbed input data points; analyze the predictions m(Pk) for the perturbed input data points to determine which features are most influential to the prediction; and output the analysis results to a user.

In embodiments, methods to ascertain how predictions are made by a black box, or opaque, in whole or in part to a user, model or algorithm are implemented. More specifically, in some embodiments, a characterization of the black box model is programmatically generated. In embodiments, the characterization may include indications of relative influence of one or more features of a dataset. In some embodiments, the characterization process may generate a human-readable "explanation" of the prediction for a given point. It is noted that "point" and "datapoint" are used interchangeably in the following description. That is, given the blackbox and the inputs, a human-readable explanation of why the black box predicts what it does for those particular inputs.

Thus, in embodiments, given a trained machine learning model, a perturbation function is used, which takes as an input a point *p* of the sort used to train the model, and which outputs a *perturbed version* of *p*, in which many variable values in *p* are the same, but some number are different. In embodiments, a "rule learner" takes as input a dataset that comprises multiple invocations of the perturbation function on a single input point *p* and outputs a "minimal" set of rules that distinguish the points in that input dataset where the predictions of the model are "nearly the same" as its predictions on the original, unperturbed point *p* from those points where the model's predictions are "quite different" than its predictions on *p*.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, the term "chip" may refer to a physical integrated circuit (IC) on a computer. A chip in the context of this document may thus refer to an execution unit that can be single-core or multi-core technology.

As used herein, including in the claims, the term "processor" may refer to a logical execution unit on a physical chip. A multi-core chip may have several cores. As used herein the term "core" may refer to a logical execution unit containing an L1 (lowest level) cache and functional units. Cores are understood as being able to independently execute programs or threads.

In embodiments, a sparse, local explanation of an unknown, or "black box" model's behavior in a specific region of its input space is provided. In embodiments, the query "why does the model make a particular prediction on a particular input?" is answered, by constructing a simplified version of the model that has "similar" performance—but generally on points close to that input. In embodiments, this is achieved by expanding an input point to several "input intervals" near it, and observing changes in the model's output over that interval.

Figure 1:
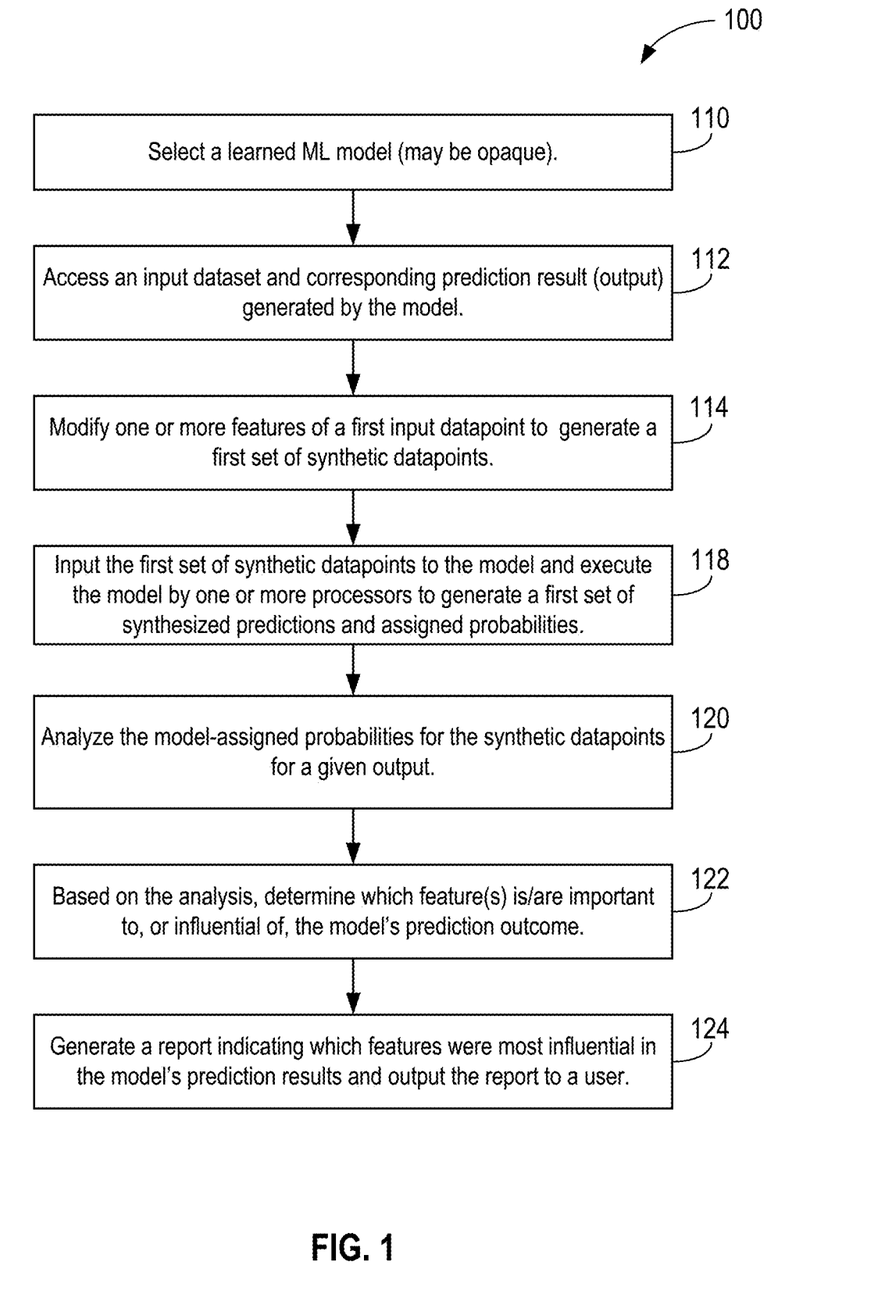
FIG. 1 illustrates an overview of the operational flow of a process for characterizing a black box prediction model, in accordance with various embodiments.

Referring now to FIG. 1, an overview of the operational flow of a process 100 for characterizing a block box prediction model, in accordance with various embodiments, is presented. Process 100 may be performed, for example, by an apparatus such as processors 702, shown in FIG. 7, for example, or system 600 of FIG. 6, for example. Process 100 includes blocks 110 through 124. In alternate embodiments, process 100 may have more or less operations, and some of the operations may be performed in different order.

Figure 3:
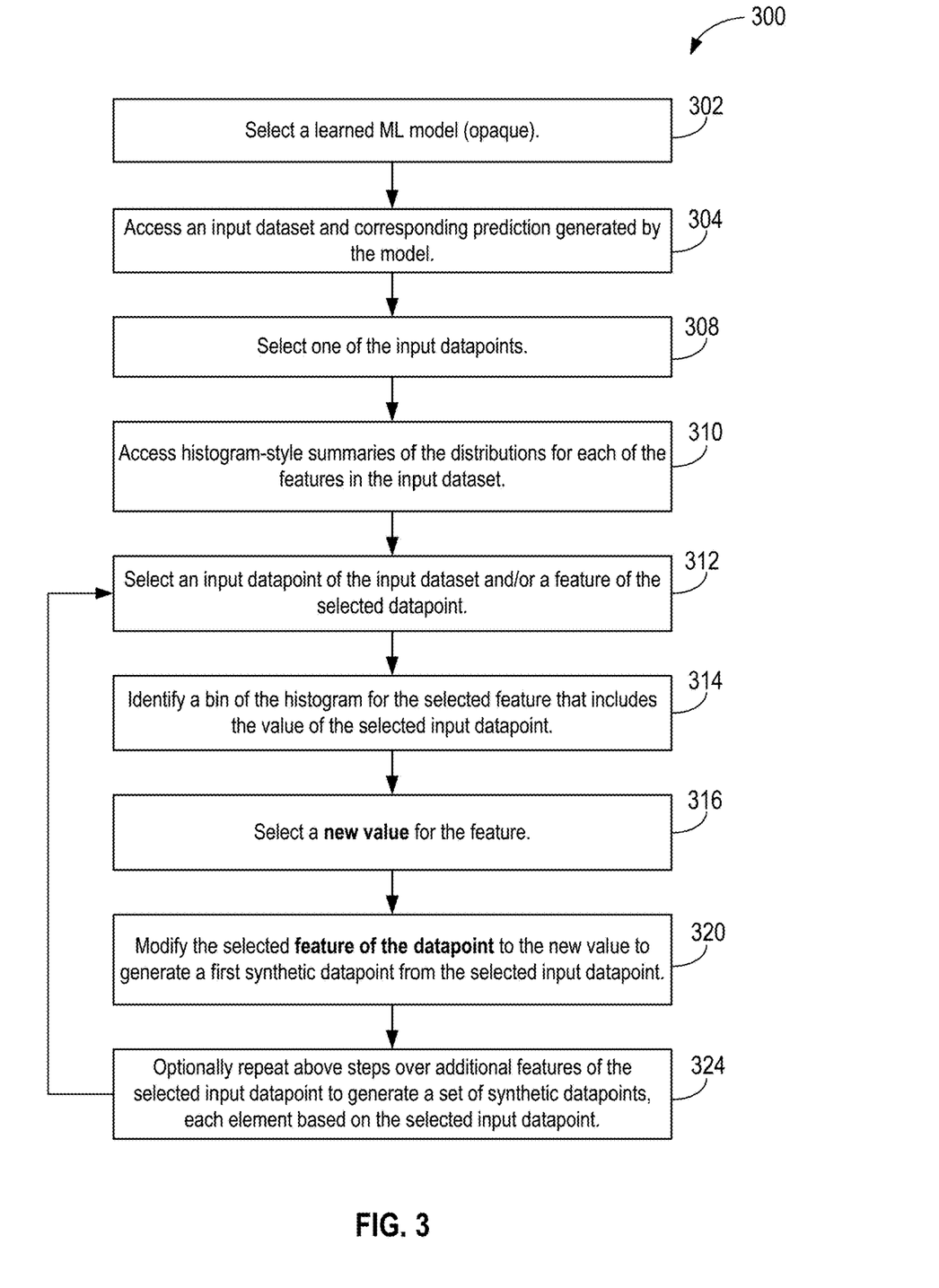
FIG. 3 illustrates an overview of the operational flow of a process for generating one or more synthetic datapoints, based on a single input datapoint, in accordance with various embodiments.

Process 100 begins at block 110, where a processor, at a user's direction, selects a learned ML model 110. As shown, the model may be opaque. From block 110, process 100 moves to block 112, where an input dataset and corresponding prediction result (output) generated by the model, is accessed. From block 112, process 100 moves to block 114, where a set of "synthetic datapoints" is generated. In embodiments, this generation may include modifying one or more features of a first input datapoint to generate the first set of synthetic data points. Further detail of modifying feature values, in one embodiment, is illustrated in FIG. 3, described below.

Figure 4:
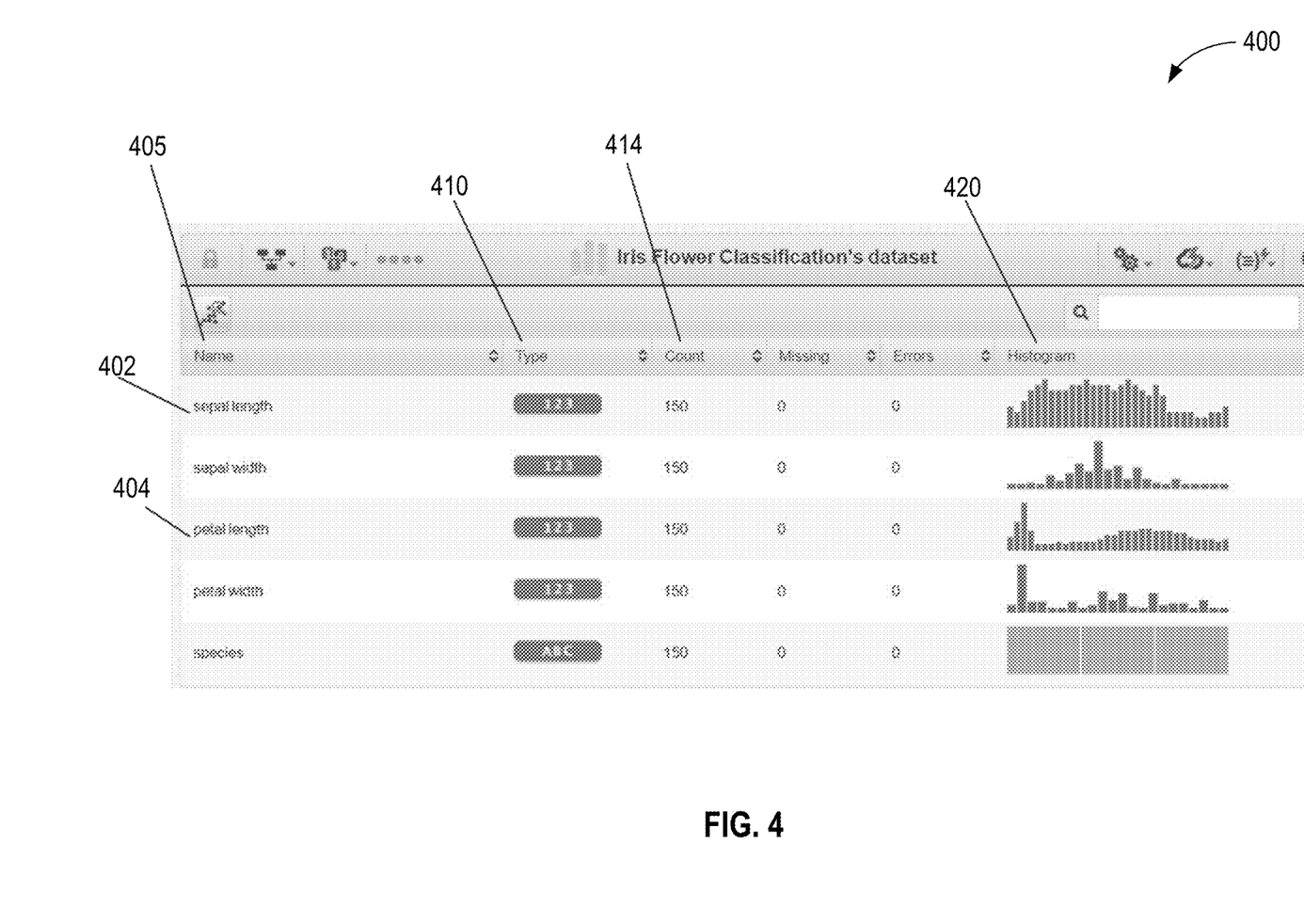
FIG. 4 is a simplified summary of a dataset including histograms for each feature, in accordance with various embodiments.

As used herein, for example here in block 114, the term "features" refers to variables, or fields, of a datapoint of a dataset. Features may, for example, be likened to fields of a record or a data instance. Thus, for example, FIG. 4 illustrates a summary of a dataset 400—namely the Iris Flower Classification's Dataset, used to classify iris flowers. Here, the fields or features are listed in the column labeled "Name" 405. Each feature listed in name 405 has a data type 410 (for example, as shown in FIG. 4, a "123" value means numeric, an "ABC" value means categorical; there may be other data types as well (no example shown). In the example dataset of FIG. 4, two exemplary features are "sepal length" 402, and "petal length" 404.

Continuing with reference to FIG. 4, column 414 shows a "Count" 414 for each feature, i.e., a number of the dataset instances that include the feature. Dataset summary 400 also includes a histogram 420 for each feature in the dataset. To construct a histogram, a first step is to "bin" the range of values—that is, divide the entire range of values into a series of intervals—and then count how many values fall into each interval or "bin." In embodiments, the bins are usually specified as consecutive, non-overlapping intervals of a variable or feature.

Referring again to FIG. 1, from block 112, process 100 proceeds to block 118, where the first set of synthetic datapoints is input to the model, and the model is executed by one or more processors, e.g., processor(s) 702, to generate a first set of synthesized predictions and assigned probabilities. From block 118 process 100 moves to block 120, where the model-assigned probabilities for the synthetic datapoints generated at block 114 for a given output [predicted class] are analyzed. From block 120, process 100 moves to block 122, where, based on the analysis, it is determined which feature(s) is or are important to, or influential of, the model's prediction outcome. From block 122, process 100 moves to block 124, where a report is generated and output to a user indicating which features were most influential in the model's prediction results, block 124.

An example illustration of process 100 is next described. It is assumed that there is an input point: [1, 2, 3, 4, 5] where each number is a value of a corresponding feature or field of a dataset. Thus, one datapoint can be expressed as a vector, in this example a vector with five dimensions. It is noted that in the dataset summary 400 of FIG. 4, individual datapoint values are not shown, but rather they are summarized in the form of histograms 420. It is further assumed that an example system may generate some synthetic points such as, or similar to, the following. It is noted that the number of synthetic data points is not critical, and in actual practice, will be much larger:

[0, 2, 3, 4, 5]
[1, 2, 3, 4, 7]
[1, 2, 4, 4, 5]
[1, 2, 3, 3, 5]

As may be seen by inspection, these synthetic datapoints are similar to the actual input, but with a few differences. In this example, each synthetic datapoint only has one dimension or field of the input vector changed. In practice, however, several dimensions may change, such as, for example:

[0, 2, 4, 4, 7]
[1, 2, 3, 6, 7]
[1, 1, 4, 4, 8]
[1, 2, 5, 2, 3]

In embodiments, the goal of this example process is to see which changes to the input datapoint result in changes to the model's prediction. In some embodiments, to generate these modifications (synthetic datapoints), a system may, for example, leverage histogram-style summaries of the distributions for each of the features in the point (such as, for example, those shown in FIG. 4). Thus, to select a "different" value for a given feature, in embodiments, the system selects a value from the histogram bin other than the one containing the current value. That way, a value is selected that is likely to be "different enough" to induce a change in the prediction. This approach is illustrated, for example, in process 300 of FIG. 3, at blocks 314 and 316, described below.

As a concrete example, the following is considered. A "black box" model is trained to predict whether a person will contract diabetes based on their age, sex, and body mass index (BMI). Thus, the input vectors to this model are each three-dimensional. For an example 48 year old male, with a BMI of 35, his input vector is thus [48, M, 35]. To perform block 114 of process 100 of FIG. 1 on this input vector, an example dataset of perturbed points may be generated as follows:

[40, M, 35]
[50, M, 35]
[48, F, 35]
[48, M, 30]
[48, M, 40]

In each input vector of the set of synthetic datapoints, one and only one variable is different from the input datapoint. As seen above, for the first two synthetic datapoints the age is different, for the third one, the sex is different, and for the last two, the BMI is different. As noted, although here only variable is perturbed per point, in general any number of fields or vector dimensions may be perturbed, depending on the desired degree of "locality".

Continuing with this diabetes prediction model example, suppose the prediction for the original input (48, M, 35) is a "Yes", i.e., that the patient with input vector [48, M, 35] will contract diabetes. It is supposed further that the predictions for the other synthetic datapoints are as follows:

[40, M, 35]→Yes
[50, M, 35]→Yes
[48, F, 35]→Yes
[48, M, 30]→No
[48, M, 40]→Yes

Thus, the prediction for the 4th perturbed point [48, M, 30] is the only prediction that is different from the prediction of the original input vector [48, M, 35]. Thus, in this (simplified) case, a single rule "BMI<35" is sufficient to separate this different prediction from all other points. As a result, in this region of the input space, it may be concluded that the "important" part of the input vector, i.e., the variable the model is "paying the most attention to" is the BMI, and more particularly, the rule that separates a "Yes" outcome form a "No" outcome is whether BMI is greater than or equal to 35.

In practice, of course, there are generally far more variables and many more values (vector dimensions) for each of those variables, so finding a minimal rule set is non-trivial. Moreover, most predictive models deal in probabilities rather than absolute predictions. Thus, even if the model still predicts the same outcome for the original input vector and all of the synthetic datapoints generated, one may still look for changes in the output probability, which is informative as to which of the input variables has the greatest effect on output, and where in the input space things begin to change in the output space.

Figure 2:
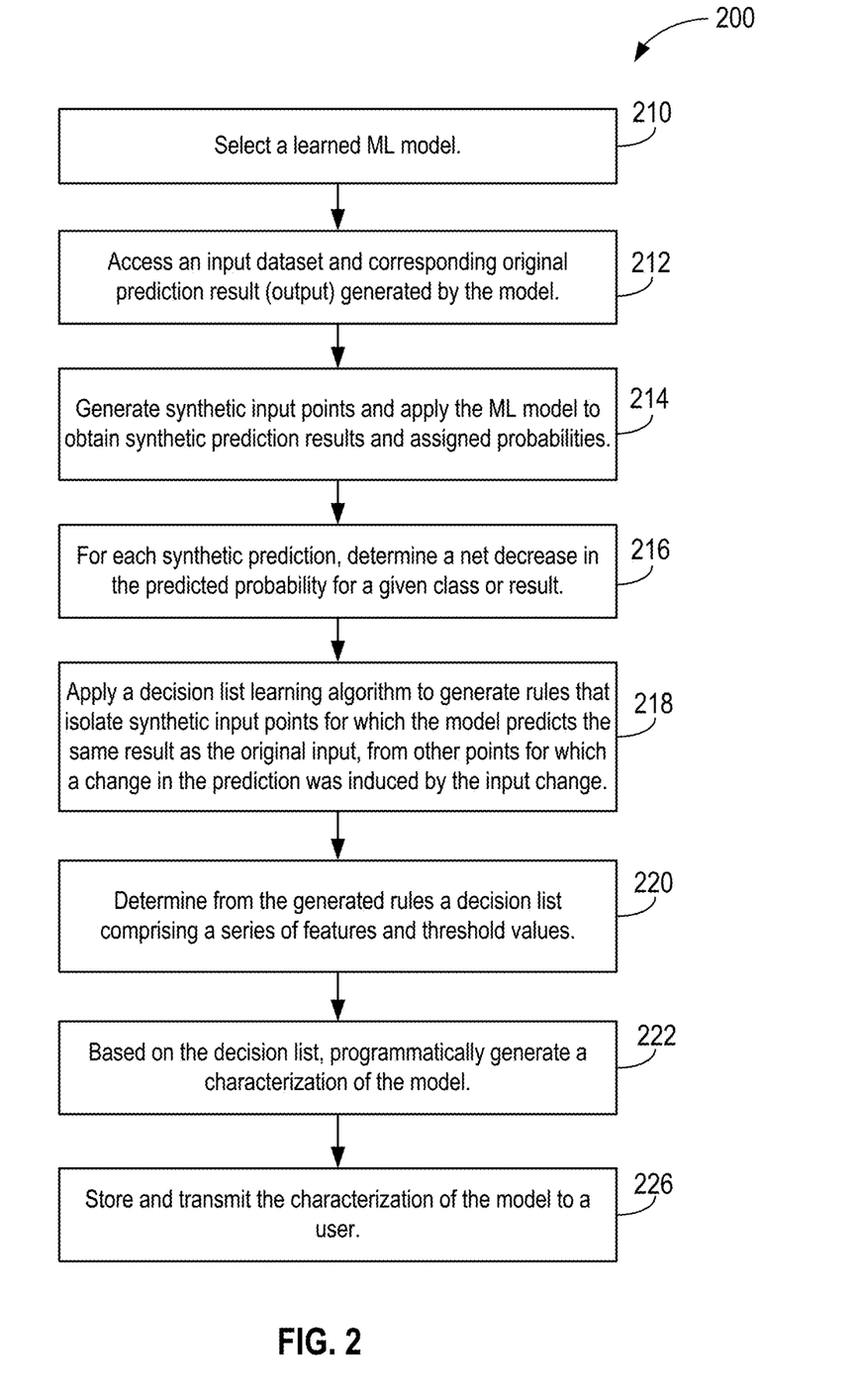
FIG. 2 illustrates an overview of the operational flow of an alternate process for characterizing a black box prediction model, in accordance with various embodiments.

Referring now to FIG. 2, an overview of the operational flow of a process 200 for characterizing a block box prediction model, in accordance with various embodiments, is presented. Process 200 may be performed, for example, by an apparatus such as processors 702, shown in FIG. 7, for example, or system 600 of FIG. 6, for example. Process 200 includes blocks 210 through 226. In alternate embodiments, process 200 may have more or less operations, and some of the operations may be performed in different order.

Blocks 210 through 214 of process 200 are essentially identical to blocks 110 through 118 of process 100, and thus need not be described again. Summarily, at block 214, synthetic input points are generated and the subject ML model executed to obtain synthetic prediction results and assigned probabilities. From block 214 process 200 moves to block 216, where, for each synthetic prediction, a net decrease in the predicted probability for a given class, or result, is determined. From block 216, process 200 moves to block 218, where an example system applies a decision list learning algorithm to generate rules that isolate input points for which the model predicts the same result from other points for which a change in the prediction probability was induced by the input change. For example, using the five dimensional input vector discussed above, supposing the prediction for the first point is:

[1, 2, 3, 4, 5]→0.8, where 0.8 is the model's predicted probability for, say, class "c", a predicted class. Supposing further that the model assigns the following probabilities for the following synthetic points:

[0, 2, 3, 4, 5]→0.8
[1, 2, 3, 4, 7]→0.2
[1, 2, 4, 4, 5]→0.9, one can readily observe that changing feature 1 had no impact on the prediction. Changing feature 3 made the prediction *more certain*, resulting in a prediction of 0.9 instead of original prediction 0.8. Only the second change, a change in feature 5, induced the model to predict a significantly lower probability, here 0.2. Thus, one may conclude that feature 5 was an important driver of the model's predictions for class c. In embodiments, the analyses of block 216 are carried out programmatically in a practical system, given that the quantity of data is assumed to be quite large.

As noted, in a practical system, there may be thousands of features and thousands of synthetic points, and thus machine learning is used to implement processes 100, 200 and 300.

It is noted that there are models called "decision lists" that generate sequences of rules that will isolate a particular point, similar to a single path in a decision tree (the same math is used in the background). Thus, a dataset as follows may be constructed, using the original point and the three perturbed input points provided above:

[1, 2, 3, 4, 5]→0.0
[0, 2, 3, 4, 5]→0.0
[1, 2, 3, 4, 7]→0.6
[1, 2, 4, 4, 5]→-0.1

As described in block 216, the model's prediction for each point has now been replaced with the net *decrease* in the predicted probabilities for class c. The first two points are unchanged, so the delta is 0.0. Points 3 and 4 (the last two perturbed input points) have a delta of 0.6 and −0.1, respectively.

From block 216, process 200 moves to block 218, where, using the decision list algorithm, rules are found that isolate the 0.0 points (points for which the model predicts the same thing as the original prediction for the actual input point) from the other points (points for which some change in the prediction was induced by the input change).

From block 218, process 200 moves to block 220, where a decision list is generated from the set of rules. The decision list is a series of features and thresholds, and can thus easily be made into a human readable explanation. From block 220, process 200 moves to block 222, where an example system programmatically determines from the generated decision list a characterization of the black box model. From block 222, process 200 moves to block 226, where the example system reports the characterization of the black box model to a user, for example, as illustrated in the system diagram of FIG. 6, via display device 635, or via communication/network interface 640 to a remote user computer 645, and for example, displayed on that remote user's display device 647, as described below.

Referring now to FIG. 3, an overview of the operational flow of a process 300 for generating one or more synthetic datapoints, based on a single input datapoint, in accordance with various embodiments, is presented. Process 300 may be performed, for example, by an apparatus such as processors 702, shown in FIG. 7, for example, or system 600 of FIG. 6, for example. Process 300 includes blocks 302 through 324. In alternate embodiments, process 300 may have more or less operations, and some of the operations may be performed in different order.

Process 300 begins at block 302, where a processor, at a user's direction, selects a learned ML model. As shown, the model may be opaque, in some sense. It may, for example, be opaque in the sense of a true black box, where the users do not have access to the model and do not know the expression of its prediction function. Or, for example, it may be opaque in the sense that the users do have access to the model, and can actually retrain it. However, due to its size, in terms of both input data point dimensions, as well as complex processing of the inputs to obtain output predictions and associated probabilities, it may be effectively opaque, even to its own designers, as to the output prediction associate with some localized region of a rather vast input space.

From block 302, process 300 moves to block 304, where an input dataset and corresponding prediction generated by the model, is accessed. From block 304, process 300 moves to block 308, where one of the input datapoints from the input dataset (accessed in block 304) is selected.

From block 308, process 300 proceeds to block 310, where histogram-style summaries of the distributions for each of the features in the input dataset are accessed. An example set of histogram-style summaries is shown, for example, at column 420 of FIG. 4, described above.

From block 310, process 300 moves to block 312, where either an input datapoint of the input dataset, or a feature of the input datapoint, or both, are selected. Initially both an input datapoint *and* a feature of that datapoint are selected. However, once that has occurred, and process 300 has moved through blocks 314, 316 and 320 to select a new value for the first selected feature, process 300 may return to block 312, to continue to select different features of the selected input datapoint, and proceed to select new values for those different features. In this way, by continuing to loop through blocks 312 through 320, a set of synthetic datapoints, all based on the selected input datapoint, are generated. From block 312, process 300 moves to block 314, where a bin of the histogram for the selected feature (e.g., one bin from the top histogram shown in column 420 of FIG. 4 for the feature "sepal length") is identified that includes the value of the selected datapoint. From block 314, process 300 moves to block 316, where a new value of that feature is selected. In embodiments, this may be done a variety of ways. In some embodiments, to ensure a meaningful distance between the old value and the new value (so as to hopefully obtain a meaningful change in output prediction) the new value may be chosen from a different bin of the histogram. In other embodiments, this need not be the case, and the perturbation algorithm may simply use different "distances" between old values and new values for features, even within the same bin of a histogram.

From block 316, process 300 moves to block 320, where the selected feature of the datapoint is modified to the new value, so as to generate a first synthetic datapoint from the selected original input datapoint. From block 320, process 300 moves to block 324, where either process 300 terminates, or process 300 moves back to block 314, to generate an additional perturbation of the input datapoint originally selected at block 312.

Next described are example algorithms, with pseudocode that may be used, in embodiments, to implement the processes described above with reference to FIGS. 1-3. To provide context for the description of these algorithms, it is assumed that there is a trained model, m. The form of the model may be unspecified, as all that is required is that the model takes some input data point p as input, and outputs a prediction for p. The prediction need not have any specific structure; the only requirement is that the predictions fall in some sort of metric space, such that the distance, or difference between any two predictions of the model m, may be measured.

For example, the model may be a classification model, where the output prediction is a class and the difference is a binary 1 or 0 depending on whether the classes match. Or, for example, model m may also be a regression model, where the prediction is a single real-valued number and the difference is the absolute value of the difference between predictions. Or, for example, it may even be an unsupervised model, such as a latent topic model, where the prediction is a distribution over topics and the difference is KL-divergence or the like.

Thus, to probe the inner workings of the model, in accordance with various embodiments, a function D is needed, which takes as input a single point, p, and outputs a set of n *perturbed* points {p_1, p_2, . . . p_n}. These perturbed points are points in which some feature values are the same as those of p, but some are modified, as described and illustrated in the various examples provided above. The function D may be constructed in a number of different ways, provided that there exists some summary information for the data used to train the model m.

Thus, in embodiments, given model m, an input p, and the function D, an explanation for m's prediction for input p, m(p), may be generated by performing the following process:

1. Create a prediction m(p). As above, this prediction is a vector of one or more numbers.
2. Create a prediction m(p_i) for each point p_i in D_p, the result of applying D to p.
3. Measure the difference between the predictions m(p) and m(p_i) for each p_i. In embodiments, the Euclidean distance between the two vectors may be used, but, in alternate embodiments, one may also use the L_1 norm, max_norm, KL-divergence, or other suitable distance metric.
4. Given the dataset of perturbed points D_p, find a set of rules based on the features of p that separates p and the other points in D_p that have a similar prediction, from those in D_p that have a significantly different prediction.

In some embodiments, detailed summary statistics for each feature in the data set used to train the model m are available. Specifically, given a set of training data, histograms may be constructed for each feature of the training data representing a discrete approximation of the distribution of each feature. Histograms can be constructed, for example, by streaming over the input data in a fashion given by the paper, Ben-Haim et al., "A Streaming Parallel Decision Tree Algorithm", Journal of Machine Learning Research 11 (2010) 849-872 available at: www.jmlr.org/papers/v11/ben-haim10a.html. An example of histograms for each of the five features of the input vectors to the iris classification dataset is shown, as noted above, in FIG. 4, at column 420.

With these histograms, in embodiments, a function draw (h[i]) may be specified, which draws a histogram bin with a probability corresponding to its frequency, and outputs a value in that bin (either a static value from, for example, the center of the bin, or a random value within the bin).

Thus, given an input point p, a model m, and histograms {h_1 . . . h_k} for each of k features in the dataset, and a distance function dist that computes the distance between two model predictions, the following pseudocode may be implemented to generate a set of perturbed input data points, in a generalization of process 300 of FIG. 3:

```
D_p = 0 // The dataset of output points
for i in 1 ... n:
    p_i = p // a copy of the original input point
    r = {k choose k/4} // the set of features from p that will be perturbed for this p_i
        // it is noted that m/4 is arbitrary; this value may be smaller, larger, or random in
        // [0, 1]
    for j in r:
    // perturb all values from this point in r
        p_i[j] = draw(h[j])
    D_p += p_i // Add p_i to the perturbed set
return D_p
```

As noted above, once prediction results are obtained for the set of perturbed input data points, a rule set that distinguishes those input points that have a different prediction result than the result of the original data point, may be constructed. Thus, in terms of the example used above, given the set D_p=D(p), rules are built that separate those points in D_p that have a different prediction from p from those that have the same or a similar prediction from p. The algorithm is designed to iteratively learn rules that eliminate "different" points from D_p, selecting at each iteration the "best rule" according to its mutual information.

In embodiments, at each iteration, a rule (a combination of a feature and a threshold on that feature) may be chosen that maximizes the mutual information between the current set of perturbed points, and the two sets one would obtain if that set was split according to the given feature and threshold. It is noted that this is essentially an equivalent process to that used in constructing a split for a decision tree with a binary objective.

Thus, given some "difference threshold" e, set D_p, and a function diff that measures the difference between any two model predictions, in embodiments, algorithms based on the following pseudocode may be implemented:

```
Label "Similar" points p_i from D_p such that diff(m(p), m(p_i)) < e
Label "Different" points p_i from D_p such that diff(m(p), m(p_i)) >n= e
output_thresholds = { }
while D_p contains at least one "different point"
    max_mi = -inf // choose the feature-threshold combination with max. mutual
            //information
    max_fv = null // the feature-threshold combination corresponding to the current
            // max_mi
    for each feature f in p:
        for each unique value v for f in D_p:
            split D_p into D_above and D_below using the threshold v for feature f
            m_f_ v = mutual information between D_p, D_above, and D_below, according to
                the labels
        if (m_f_v > max_mi)
            max_mi = m_f_v // the new best mutual information
            max_fv = (f, v) // remember this feature and value
            D_thresh = D_above if p falls into D_below and vice-versa
            output_thresholds += max_v
            D_p = D_p / D_thresh // remove those points that did not satisfy the best rule
```

In practice, computing the mutual information for all implied subsets is often too costly. However, as in decision tree learning, the mutual information computation admits lazy updating as the set of points is traversed, and as a result, the algorithm can run in a reasonable time.

In embodiments, normalized importances for each discovered rule may be constructed according to how many "different" points were removed from D_p by that rule.

Figure 5:
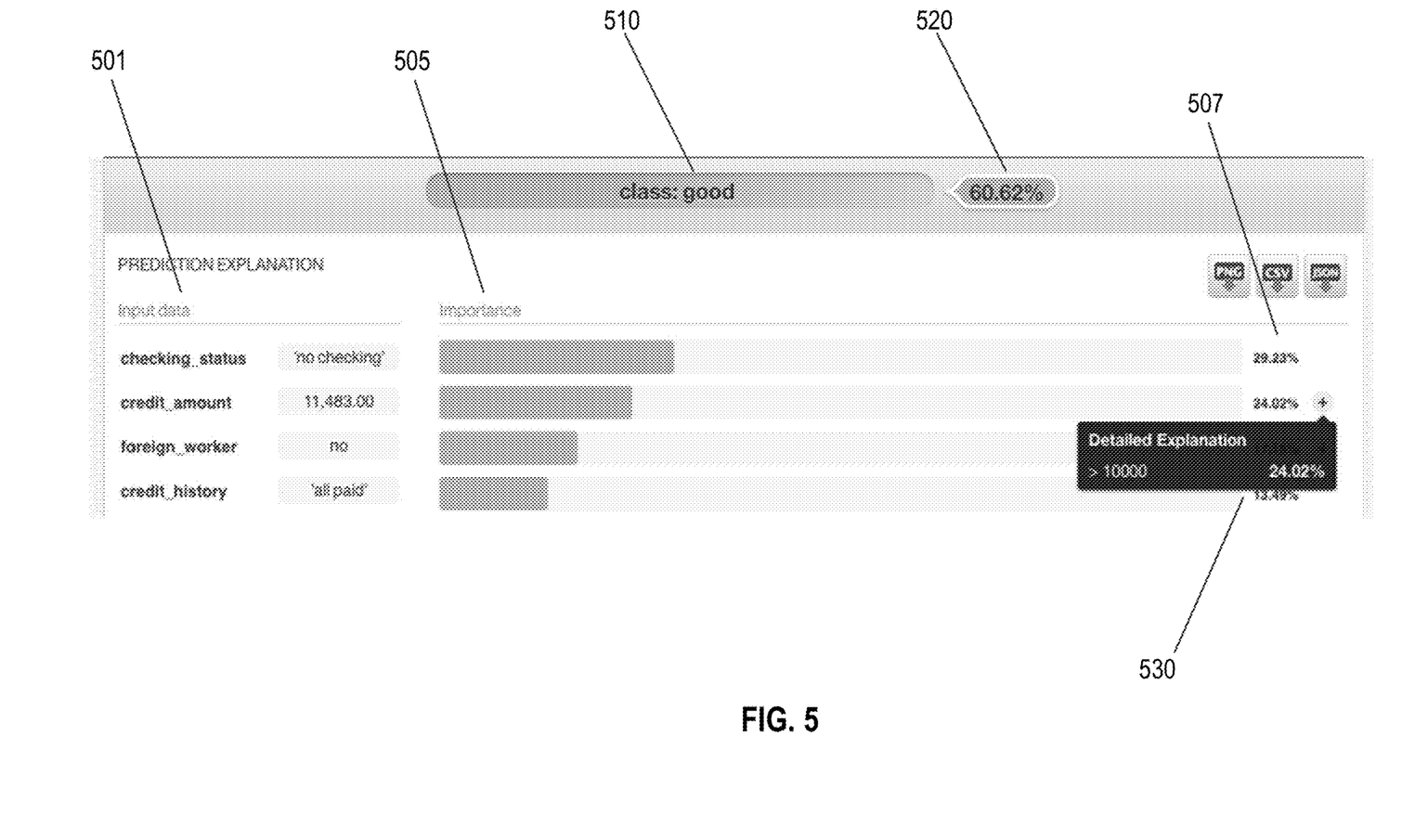
FIG. 5 is an example output prediction explanation for a sample prediction result of an example black box credit risk classification model, in accordance with various embodiments.

FIG. 5 illustrates an image of an example output prediction explanation for a sample prediction made by an example credit risk model, in accordance with various embodiments. With reference to FIG. 5, each of the four features of an example input vector to the model is shown at leftmost column "Input data" 501. In this example, these features include checking_status, credit_amount, foreign_worker, and credit_history, and for the example input point shown in FIG. 5, the values for these features are [no checking, 11,483, no, allpaid]. The next column to the right of column 510 is "Importance" 505. This column depicts a bar that graphically demonstrates the importance of that feature to the model in making a credit risk prediction. At the far right of the bar, in column 507, a numerical percentage is provided that corresponds to the length of the bar. The percentages add up to 100%. By mousing over the icon at the right the relevant threshold value may be viewed for that feature, as shown at "Detailed Explanation" pop-up 530. In this example, for the feature "credit amount", the threshold is 10,000. The datapoint lists a value of "11,483" for this feature, which is obviously above the threshold. The prediction output is a classification of "good" as shown at 520, with a probability of 60.62% that the classification is accurate.

Next described is a comprehensive example of perturbation of an input datapoint, generation of predictions for the perturbed points from a machine learning model, generating an explanation for the model, and illustrating the concept of mutual information discussed above, in accordance with various embodiments. The model used in the example was trained to predict credit risk based on an applicant's net worth, currently salary, and length of employment in years. The example model is the same one for which an example prediction explanation is illustrated in FIG. 5, described above. For purposes of the example, it is assumed that an applicant evaluated by this model has the following attributes, which constitute the input data point to the model:

Net worth: $100,000
Salary: $40,000
Employment Length: 5 years

Thus, the input data point P for this applicant is P=[100,000, 40,000, 5]. Applying, for example, process 300 of FIG. 3, or, for example, an algorithm based on the pseudocode provided above, a set of perturbed points may be generated as follows, where each entry is a 3-tuple with the following fields (or vector dimensions): (Net_worth, Salary, Employment_length):

[80,000, 40,000, 5]
[90,000, 40,000, 5]
[110,000, 40,000, 5]
[120,000, 40,000, 5]
[80,000, 30,000, 5]
[80,000, 50,000, 5]
[80,000, 60,000, 5]
[80,000, 40,000, 2]
[80,000, 40,000, 4]
[80,000, 40,000, 6]

It is noted that in each perturbed point in the set above, only one feature value is different from P, and the remaining two features are the same as in P.

Is it further assumed that the model predicts a credit risk class of "good" for the input point P, and predicts the following for the perturbed points, where the prediction is listed as the last feature in the input+output 4-tuple:

[80,000, 40,000, 5, bad]
[90,000, 40,000, 5, good]
[110,000, 40,000, 5, good]
[120,000, 40,000, 5, good]
[80,000, 20,000, 5, bad]
[80,000, 30,000, 5, bad]
[80,000, 60,000, 5, good]
[80,000, 40,000, 2, good]
[80,000, 40,000, 4, good]
[80,000, 40,000, 6, good]

Note here that the "bad" points (bolded) are different because their prediction is different from that of input point P, whose prediction is "good". The "good" points obviously have the same output prediction as P. In other embodiments, the predictions may be probabilities, and line between "different" and "same" may be some minimum difference in probability, as noted above.

Iterating through the above dataset with every possible threshold and feature, and measuring the mutual information each time, it is found that the maximum mutual information occurs at "salary>=40,000", which isolates two of the "bad" (different) points, and leaves only one bad different remaining. So this may be chosen as a first rule, and the procedure repeated with those two points, [80,000, 20,000, 5, bad] and [80,000, 30,000, 5, bad], eliminated, leaving the following truncated set of perturbed points:

[80,000, 40,000, 5, bad]
[90,000, 40,000, 5, good]
[110,000, 40,000, 5, good]
[120,000, 40,000, 5, good]
[80,000, 60,000, 5, good]
[80,000, 40,000, 2, good]
[80,000, 40,000, 4, good]
[80,000, 40,000, 6, good].

For the remaining data, the threshold "net worth>=90,000" gives perfect mutual information. Thus, that rule is chosen as the second and final rule. Because there are no different points remaining after removing this last bad point, [80,000, 40,000, 5, bad], the process terminates.

In embodiments, importance may be attributed to these rules based on the amount of difference removed. Thus, in the above comprehensive example, one may say that the rule or threshold of "salary>=40,000" is twice as important as the rule or threshold of "net worth>=90,000", because the first rule removed two "different" points with the changed output prediction, and the second rule removed only one, so that their normalized importances would be 0.667 and 0.333, respectively.

Thus, these two rules comprise an explanation of why the model predicted original input point P=[100,000, 40,000, 5] to have the output prediction of "good" rather than "bad". This could be used as advice to the borrower as regards what to avoid to retain their status as a "good" credit risk, or, for example, as advice to a lender as to which potential borrowers are likely to be approved (for example, for targeted marketing). If the prediction for this borrower turns out to be incorrect, such as, for example, they default on a loan, this data then provides information for the model builder about a portion of the input space that may be problematic for the current model, inasmuch as its predictive power is weak in the portion of the input space within a defined distance from P.

It is noted that exemplary embodiments may be used for various purposes, including legal, informative or instructional. For example, for legal purposes, in accordance with various embodiments, an explanation of a given model and its operation, may be given in order to comply with the new "right to an explanation" parts of the EU's general data protection regulation (GDPR).

As an example of informative purposes, in embodiments, where a user does know the inner operation of a model, and so has access to it to retrain it, if one found, for example, that points in a certain important region of the input space were incorrectly predicted by the model because the model was being driven by variables that were otherwise uninformative, one could retrain the model with those variables eliminated from the training data. On the other hand, if those same variables were informative in other regions of the input space, a user may seek to augment the training data with variables that were informative in this particular important region (where the points were incorrectly predicted) to improve the performance in that important region.

As an example of an instructional purpose, in the medical diagnosis example described above, a patient may be interested in the variables most responsible for increasing or decreasing their particular risk for disease, or, in a sophisticated model, given a significant risk of contracting the disease, those variables that most responsible for the onset of (severe) symptoms, according to the model.

It is noted that in some embodiments, every model is a black box, even to its creators. This is because few if any human minds can hold, in their mind, how a model may operate for any given slice of a complex input space of many dimensions. Thus, using various embodiments, creators and users of a proprietary model may come to understand its prediction methodology by perturbing input points in a local "volume" (multi-dimensional) of its input space and noting where boundaries lie within the local input space "volume" between significant changes in output.

Figure 6:
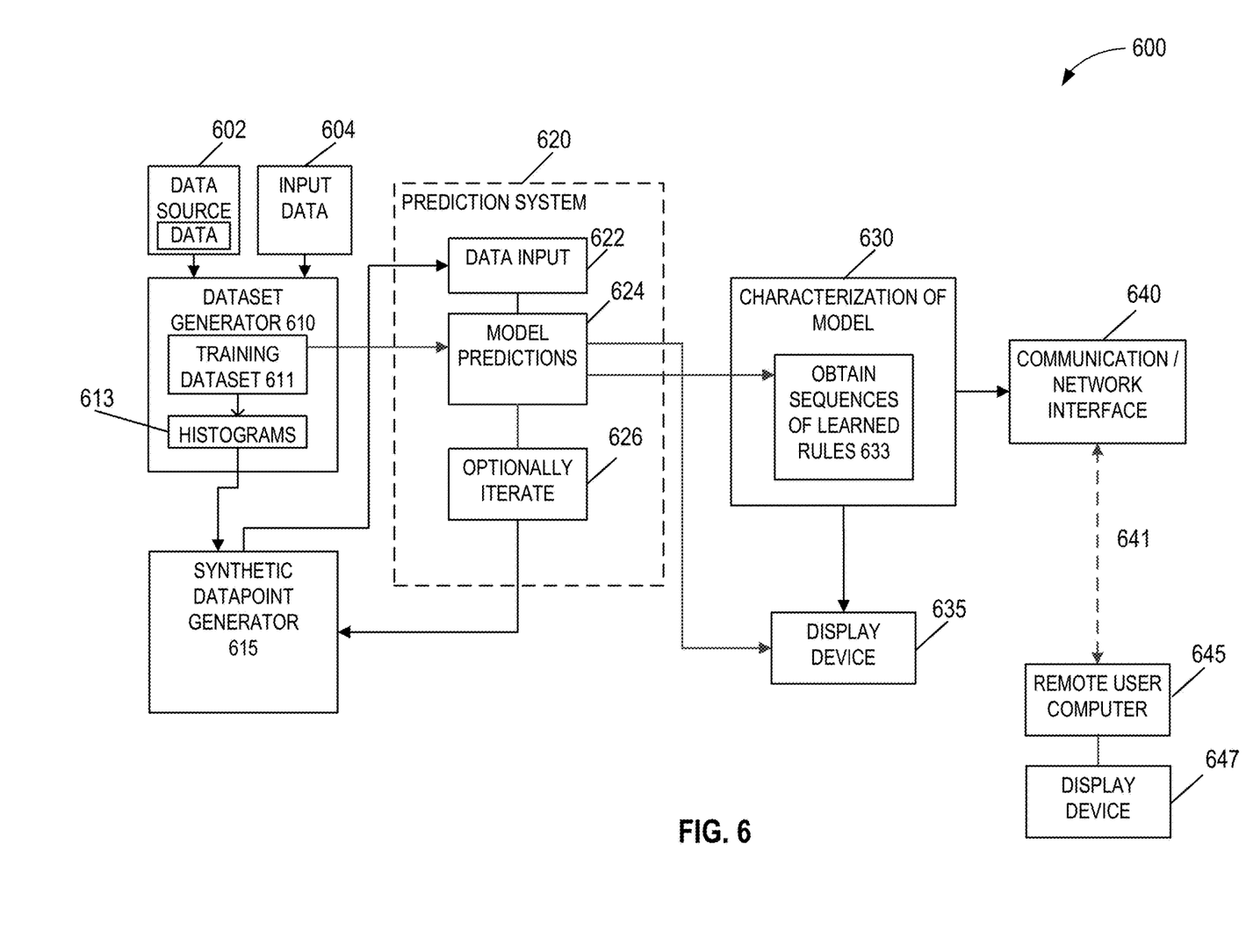
FIG. 6 is a simplified block diagram of an example system for characterizing a prediction model, in accordance with various embodiments.

FIG. 6 is a simplified block diagram of an example system for characterizing a prediction model, in accordance with various embodiments. The predictive model is opaque, or a black box, in some sense, to a user of the system. As noted above, the user may not have access at all to the inner workings of the model, and may thus only provide inputs to it and receive outputs from it, or, for example, the user may have access to its inner processing algorithms, but the model may be so complex and intractable, that effectively the only way a human user may clearly understand its inner workings is to perturb it at a localized region of its input space, in accordance with various embodiments. With reference thereto, there are two possible data sources for the model, data source 602, and input data 604. Data source 602 requires preprocessing to obtain the data that is ultimately output to dataset generator 610, whereas input data 604 is data already in condition to be input to, and processed by, the model. Each of data source 602 and input data 604 supplies data to dataset generator 610, which generates a training set 611 with which to train the model. The data in training set 611 may generally include several input data points, of multiple dimensions. Training set 611 may be an initial training set, or it may be a much more evolved one, after the model has been put in use, and thus able to obtain very accurate predictions form the model. Dataset generator 610 may further generate histograms 613 that segregate the features of each data point in the training dataset into several bins, such as is shown in FIG. 4, described above.

Continuing with reference to FIG. 6, in a basic use of the model to obtain prediction results, dataset generator 610 may use training dataset 611 to obtain prediction outputs for each input data point in training dataset 611 from the chosen model by inputting the training dataset to model predictions 624. These results may be output directly to display device 635, where the predictions of the model may be visualized and accessed by a user. However, in embodiments, as described above, system 600 may be used to perturb various input data points to probe the inner workings of the model. This is performed by synthetic datapoint generator 615, which, receives histograms 613 from dataset generator 610, and creates sets of synthetic datapoints for each input data point, as described above with reference to FIG. 3. In some embodiments, the histogramming may be omitted, and training dataset 611 directly output to synthetic datapoint generator 615.

Synthetic datapoint generator 615 outputs a set of synthetic datapoints to data input 622 of prediction system 620, which, in turn, outputs the synthetic datapoints to model predictions 624, which obtains the predictions of the model for the set of synthetic data points. These predictions may then be output to characterization of model 630, for analysis. Either before (not shown), or after (shown) obtaining model predictions at 624, it may be decided to further iterate the generation of synthetic datapoints, as shown at optionally iterate block 626. In one example, the decision may be made after obtaining model predictions at 624, if there are not a sufficient number of changed predictions for the synthetic data points relative to the original data point used to generate them. In such exemplary cases, the perturbations were not significant enough, and thus not useful to learn the predictive process of the model by learning, or inferring, rules and thresholds used in those rules, as described above in the comprehensive example. If the decision is made at optionally iterate 626, then a new set of synthetic data points is generated at 615, and processed in prediction system 620 as described above.

Continuing further with reference to FIG. 6, when a final set of model predictions are obtained for a final set of synthetic datapoints, these are output from model predictions 624 to characterization of model 630. In particular, for example, the predictions may be output, as shown, to obtain sequences of learned rules 633, for rule generation to explain the tipping thresholds that trigger a change in output predictions of the model in a local region in vector space surrounding an input data point. These rules may then be output to a user, via display device 635, or for example, sent to a remote user computer 645 having a display device 647, over network link 641, after being output to communication/network interface 640.

It is noted that a user of example system 600 may thus be remote from both the system and a server that provides the model. Thus, for example, in black box models where the operator of system 600 does not have access to the models inner workings, such as where it is a proprietary model, model predictions 624 are obtained by prediction system sending input data to, and receiving output data from, a remote server where the model is operating (the remote server is not shown in FIG. 6). In such an example system, training dataset is generated remotely from the model, and data input 622 sends the data inputs to the remote model, and model predictions 624 receives the model predictions from the remote model, across a data or communications link (not shown). In this way system 600 may be used to "reverse engineer" a proprietary scoring model operated by a remote third party, such as, for example, a lender, where the user of system 600 is an applicant trying to understand how to improve, or maintain, a credit score.

In embodiments, all of the local portions of system 600 may be combined in a "model characterization engine" run on one or more processors, thus including blocks 615, 620 and 630 of FIG. 6, for example.

Figure 7:
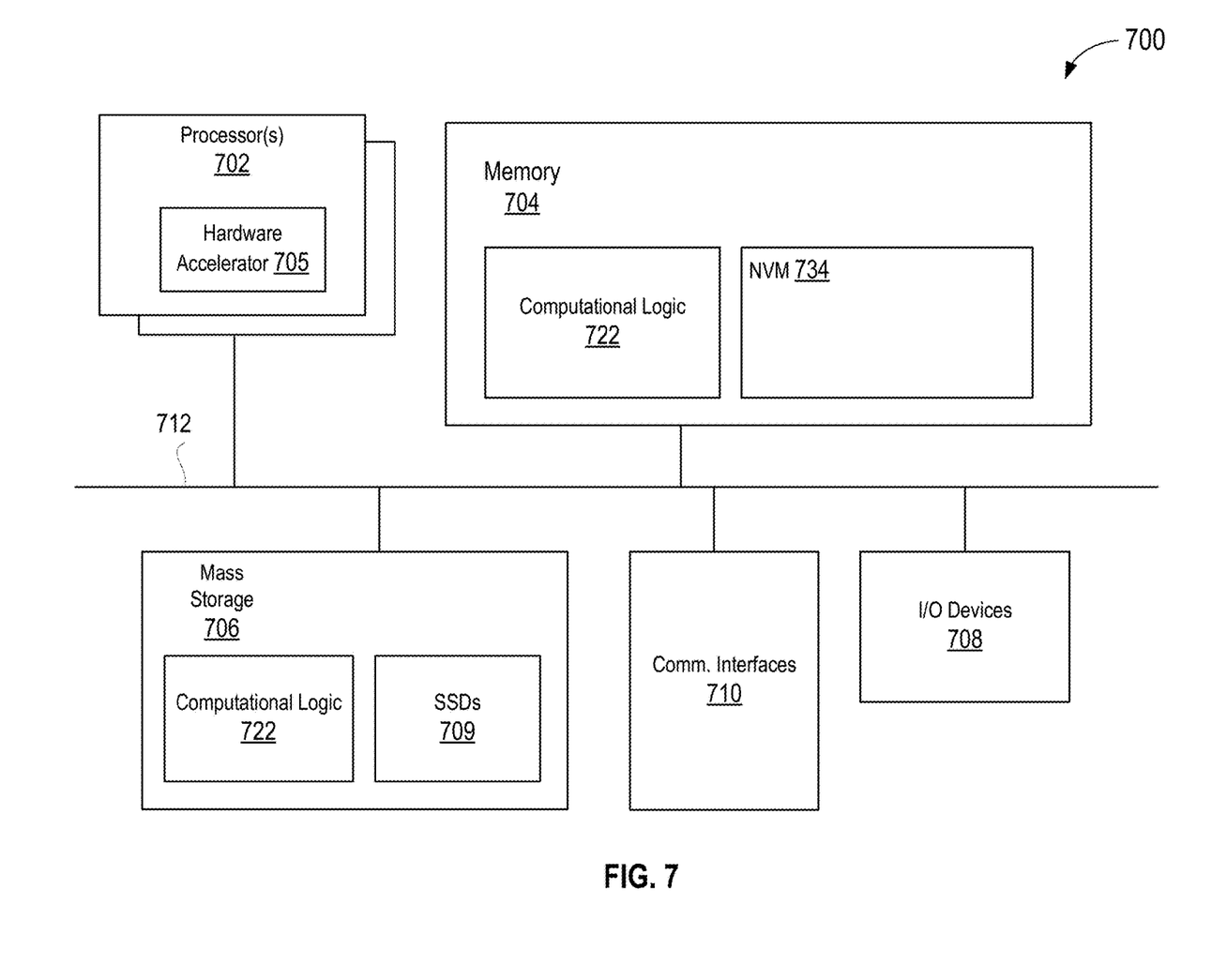
FIG. 7 illustrates a block diagram of a computer device suitable for practicing the present disclosure, in accordance with various embodiments.

Referring now to FIG. 7 wherein a block diagram of a computer device suitable for practicing the present disclosure, in accordance with various embodiments, is illustrated. As shown, computer device 700 may include one or more processors 702, and system memory 704. Each processor 702 may include one or more processor cores, and hardware accelerator 705. An example of hardware accelerator 705 may include, but is not limited to, programmed field programmable gate arrays (FPGA). In embodiments, processor 702 may also include a memory controller (not shown). In embodiments, system memory 704 may include any known volatile or non-volatile memory, including, for example, NVM 734.

Additionally, computer device 700 may include mass storage device(s) 706 (such as SSDs 709), input/output device interface 708 (to interface with various input/output devices, such as, mouse, cursor control, display device (including touch sensitive screen), and so forth) and communication interfaces 710 (such as network interface cards, modems and so forth). In embodiments, communication interfaces 710 may support wired or wireless communication, including near field communication. The elements may be coupled to each other via system bus 712, which may represent one or more buses. In the case of multiple buses, they may be bridged by one or more bus bridges (not shown). It is here noted that although not shown, when mass storage 706 includes SSDs, such SSDs may also include an integrated controller.

Each of these elements may perform its conventional functions known in the art. In particular, system memory 704 and mass storage device(s) 706 may be employed to store a working copy and a permanent copy of the executable code of the programming instructions of an operating system, one or more applications, and/or various software implemented components of process 100 of FIG. 1, process 200 of FIG. 2 and process 300 of FIG. 3, earlier described, in accordance with various embodiments, collectively referred to as computational logic 722. The programming instructions implementing computational logic 722 may comprise assembler instructions supported by processor(s) 702 or high-level languages, such as, for example, C, that can be compiled into such instructions. In embodiments, some of computing logic may be implemented in hardware accelerator 705. In embodiments, part of computational logic 722, e.g., a portion of the computational logic 722 associated with the runtime environment of the compiler may be implemented in hardware accelerator 705.

The permanent copy of the executable code of the programming instructions or the bit streams for configuring hardware accelerator 705 may be placed into permanent mass storage device(s) 706 and/or hardware accelerator 705 in the factory, or in the field, through, for example, a distribution medium (not shown), such as a compact disc (CD), or through communication interface 710 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 710-712 may vary, depending on the intended use of example computer device 700, e.g., whether example computer device 700 is a smartphone, tablet, ultrabook, a laptop, a server, a set-top box, a game console, a camera, and so forth. The constitutions of these elements 710-712 are otherwise known, and accordingly will not be further described.

Figure 8:
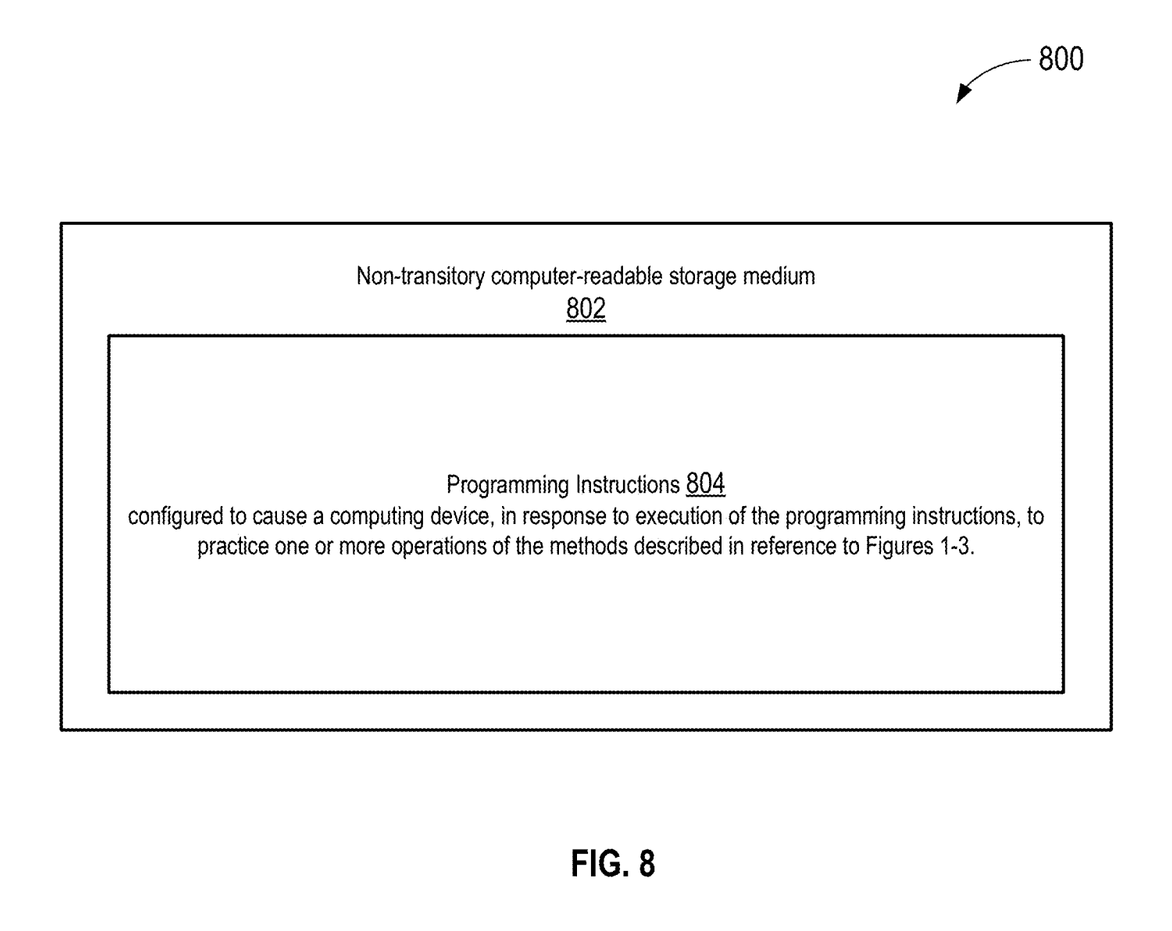
FIG. 8 illustrates an example computer-readable storage medium having instructions configured to practice aspects of the processes of FIGS. 1-3, in accordance with various embodiments.

FIG. 8 illustrates an example computer-readable storage medium having instructions configured to implement all (or portion of) software implementations of process 100 of FIG. 1, process 200 of FIG. 2 and process 300 of FIG. 3, earlier described, in accordance with various embodiments. As illustrated, computer-readable storage medium 802 may include the executable code of a number of programming instructions or bit streams 804. Executable code of programming instructions (or bit streams) 804 may be configured to enable a device, e.g., computer device 700, in response to execution of the executable code/programming instructions (or operation of an encoded hardware accelerator 775), to perform (aspects of) process 100 of FIG. 1, process 200 of FIG. 2 and process 300 of FIG. 3. In alternate embodiments, executable code/programming instructions/bit streams 804 may be disposed on multiple non-transitory computer-readable storage medium 802 instead. In embodiments, computer-readable storage medium 802 may be non-transitory. In still other embodiments, executable code/programming instructions 804 may be encoded in transitory computer readable medium, such as signals.

Referring back to FIG. 7, for one embodiment, at least one of processors 702 may be packaged together with a computer-readable storage medium having some or all of computing logic 722 (in lieu of storing in system memory 704 and/or mass storage device 706) configured to practice all or selected ones of the operations earlier described with reference to FIGS. 1-3. For one embodiment, at least one of processors 702 may be packaged together with a computer-readable storage medium having some or all of computing logic 722 to form a System in Package (SiP). For one embodiment, at least one of processors 702 may be integrated on the same die with a computer-readable storage medium having some or all of computing logic 722. For one embodiment, at least one of processors 702 may be packaged together with a computer-readable storage medium having some or all of computing logic 722 to form a System on Chip (SoC). For at least one embodiment, the SoC may be utilized in, e.g., but not limited to, a hybrid computing tablet/laptop.

Persons of ordinary skill in the art will recognize that the present disclosure is not limited to what has been particularly shown and described hereinabove. Rather, the scope of the present disclosure includes both combinations and sub-combinations of the various features described hereinabove as well as modifications and variations that would occur to such skilled persons upon reading the foregoing description without departing from the underlying principles. Only the following claims, however, define the scope of the present disclosure.

What is claimed is:

1. One or more non-transitory computer-readable media including instructions, which when executed by one or more processors of a computing system, causes the computing system to:
access a machine learning model m, an input data point P to m, P including one or more features, and an original prediction mP of m for P;
execute a perturbation function to create a first set of perturbed input data points Pk from P by changing a value of at least one feature of P to generate each perturbed input data point;
wherein the perturbation function is configured to access a histogram that summarizes datapoint values for each of the features of P, the histogram comprising a series of bins, and determine which one of the bins of the corresponding histogram the value of each of the features in P falls within; and
the perturbation function changes the value of at least one feature of P for each of the perturbed input data point in the first set of perturbed input data points Pk by selecting a new value for each of the at least one feature of P from a different bin of the corresponding histogram than the original value of that feature falls within;
execute the model m to obtain a new prediction mPk for each of the perturbed input data points to programmatically generate a first set of synthetic predictions and assigned probabilities that each of the first set of synthetic predictions is accurate;
compare the first set of synthetic predictions to the original prediction mP to identify first samples where the synthetic prediction is different from a value of the original prediction mP;
for each of the identified first samples, determine at least one feature that was changed to form the corresponding input data point, and at least one perturbed value of those changed features;
determine a threshold value above or below which the new prediction mPk changes from mP for each changed feature in the first samples; and
output from the computing system a human-readable characterization of the model m, the characterization comprising a listing of the changed features and the corresponding threshold value for each feature, thereby defining a boundary in the input space between significant changes in output predictions.

2. The one or more computer readable media of claim 1, wherein the instructions further cause the computing system to execute the perturbation function comprising:
access histograms for each of k features in a training dataset of the model m, the histograms representing a discrete approximation of the distribution of each feature;
select a subset r of the k features to be perturbed around P;
for each of the selected r features, execute a draw function that draws a histogram bin with a probability corresponding to its frequency, and outputs a value in a corresponding bin;
add the output value as the perturbed value for the corresponding feature; and
execute the draw function over the remaining selected r features to generate the perturbed input data point around P.

3. The one or more computer readable media of claim 2, wherein the output value is a static value from the center of the histogram bin.

4. The one or more computer readable media of claim 2, wherein the output value is a random value from within the histogram bin.

5. The one or more computer readable media of claim 1, comprising:
for each of the perturbed input data point in the first set of perturbed input data points Pk, apply a difference function to measure a difference between the original prediction mP and the new prediction mPk to determine a distance metric;
identify the perturbed input data points whose distance metric exceeds a pre-defined distance threshold value e;

label as different the perturbed input data points where the distance metric exceeds the pre-defined distance threshold value e; and construct a rule set that distinguishes the perturbed input data points that have a different prediction result label than the result of the input data point P, by iteratively learning rules that eliminate different points, selecting at each iteration the best rule defined as a rule that maximizes mutual information between the perturbed input data points.

6. The one or more computer readable media of claim 5, wherein the distance metric is one of Euclidean, L_1 norm, max_norm, or KL-divergence.

7. The one or more computer readable media of claim 1, further comprising instructions that, when executed, cause the computing system to:

generate a prediction explanation screen display for a classification model, which may be a black box model, the prediction explanation screen display showing, for a single sample prediction, at least some of the one or more features, identifying each feature name, input value, and relative importance, the relative importance displayed graphically and/or numerically;

detect a user input from a user interface coupled to the computing system, the user input selecting one of the displayed input data features;

responsive to the user input, displaying a detailed explanation in the prediction explanation screen display of the selected input data feature, wherein the detailed explanation includes a threshold value of the selected feature.

8. The one or more computer readable media of claim 1, wherein the model is proprietary, accessible via a remote server, and further comprising instructions that, when executed, cause the computing system to access the model over a network link between the computing system and the remote server.

9. The one or more computer readable media of claim 1, which when executed by one or more processors of a computing system, further causes the computing system to:

programmatically compare the first set of synthetic predictions to the original prediction mP to identify second samples where a second synthetic prediction is the same as the original prediction value, but the assigned probability for the second synthetic prediction is different from the original prediction by at least a selected difference in probability; and output from the computing system a second rule to further characterize the model m, the second rule comprising indicating a set of features identified in the second samples as a driver of the model's prediction.

10. The one or more computer readable media of claim 9, which when executed by one or more processors of a computing system, further causes the computing system to:

for each of the second samples, calculate a corresponding net decrease in the assigned probability for a given class or result, relative to the original prediction mP; and select at least one feature of the input data point as a driver of the model's prediction based on the corresponding net decrease in the assigned probabilities.

11. The one or more computer readable media of claim 1, which when executed by one or more processors of a computing system, further causes the computing system to:

programmatically construct a modified dataset comprising the input data point and the first set of perturbed input data points;

in the modified dataset, for each input data point, insert the corresponding net decrease in the assigned probability as an output or result to further characterize the model m.

12. A computing system comprising:

one or more processors to implement a model characterization engine, the model characterization engine comprising executable instructions, which when executed by one or more processors of a computing system, cause the computing system to:

access a machine learning model m, an input data point P to m, P including one or more features, and an original prediction mP of m for P;

execute a perturbation function to create a first set of perturbed input data points Pk from P by changing a value of at least one feature of P to generate each perturbed input data point;

wherein the perturbation function is configured to access a histogram that summarizes datapoint values for each of the features of P, the histogram comprising a series of bins, and determine which one of the bins of the corresponding histogram the value of each of the features in P falls within; and execute the model m to obtain a new prediction mPk for each of the perturbed input data points to programmatically generate a first set of synthetic predictions and assigned probabilities that each of the first set of synthetic predictions is accurate;

compare the first set of synthetic predictions to the original prediction mP to identify first samples where the synthetic prediction is different from a value of the original prediction mP;

for each of the identified first samples, determine at least one feature that was changed to form the corresponding input data point, and at least one perturbed value of those changed features;

determine a threshold value above or below which the new prediction mPk changes from mP for each changed feature in the first samples; and output from the computing system a human-readable characterization of the model m, the characterization comprising a listing of the changed features and the corresponding threshold value for each feature, thereby defining a boundary in the input space between significant changes in output predictions.

13. The computing system of claim 12, including programmatically generating rules that distinguish the perturbed input data points whose prediction mPk is different than mP from the perturbed input data points whose prediction mPk is within a pre-defined distance of mP.

14. The computing system of claim 13, wherein the pre-defined distance is one of Euclidean, L_1 norm, max_norm, or KL-divergence.

15. The computing system of claim 13, wherein the rules include a threshold above or below which the new prediction mPk changes from mP, or changes at least by a pre-defined distance threshold from mP.

16. The computing system of claim 12, wherein to output the analysis results to a user, the model characterization engine is further configured to cause the computing system to display a prediction explanation graphic for either P or Pk to the user, the prediction explanation graphic including each of the features of P or Pk, as the case may be, the value of each of those features, and a relative importance indication of each feature.

* * * * *